US012782124B2

(12) United States Patent
Cardoso et al.

(10) Patent No.: US 12,782,124 B2
(45) Date of Patent: Nov. 3, 2026

(54) METHOD AND TOOL FOR CALIBRATING A PASSIVE POSITIONING SYSTEM

(71) Applicant: COMMISSARIAT A L'ENERGIE ATOMIQUE ET AUX ENERGIES ALTERNATIVES, Paris (FR)

(72) Inventors: Michel Cardoso, Gif-sur-Yvette (FR); Florence Grassin, Gif-sur-Yvette (FR); Vincent Saint Martin, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 414 days.

(21) Appl. No.: 18/687,761

(22) PCT Filed: Aug. 19, 2022

(86) PCT No.: PCT/EP2022/073207
§ 371 (c)(1),
(2) Date: Feb. 28, 2024

(87) PCT Pub. No.: WO2023/030923
PCT Pub. Date: Mar. 9, 2023

(65) Prior Publication Data

US 2024/0401943 A1 Dec. 5, 2024

(30) Foreign Application Priority Data

Aug. 31, 2021 (FR) ....................................... 2109075

(51) Int. Cl.
*G01B 21/04* (2006.01)
*G01B 11/00* (2006.01)
(Continued)

(52) U.S. Cl.
CPC .......... *G01B 21/042* (2013.01); *G01B 11/005* (2013.01); *G01B 11/03* (2013.01);
(Continued)

(58) Field of Classification Search
CPC .... G01B 21/042; G01B 11/005; G01B 11/03; G01N 29/0618; G01N 29/0663; G01N 29/225; G01N 29/265; G01N 29/4472
See application file for complete search history.

(56) References Cited

U.S. PATENT DOCUMENTS

2011/0107270 A1* 5/2011 Wang ..................... G16H 20/40
703/11
2015/0016777 A1* 1/2015 Abovitz ............. G02B 27/0093
385/37
2016/0239080 A1* 8/2016 Marcolina ............... G06F 3/011

FOREIGN PATENT DOCUMENTS

FR 3087254 A1 * 4/2020 ............. G01S 7/497
FR 3 105 423 A1 6/2021
KR 102064149 B1 * 1/2020 ......... G01N 21/8851

* cited by examiner

*Primary Examiner* — Catherine T. Rastovski
*Assistant Examiner* — Nyla Gavia
(74) *Attorney, Agent, or Firm* — BakerHostetler

(57) ABSTRACT

A method is provided for calibrating a device for non-destructive inspection of a mechanical part. The device includes an optical movement tracking system to which a reference reference frame is linked, a sensor-holder, a first rigid body, a non-destructive inspection sensor secured to the sensor-holder fixedly linked to the first rigid body, and a computer. The method includes: determination, from three points on a top flat surface of a calibration block, of the length and the width of the calibration block; determination of a first transformation matrix from the reference reference frame to a reference frame of the block linked to the calibration block; disposition of the sensor on the top flat
(Continued)

surface of the calibration block; determination, from three points on the first rigid body, of the length and the width of the sensor; and determination of a second transformation matrix making it possible to switch from a reference frame linked to the sensor-holder to a reference frame linked to the sensor.

11 Claims, 11 Drawing Sheets

(51) Int. Cl.

| | |
|---|---|
| ***G01B 11/03*** | (2006.01) |
| ***G01N 29/06*** | (2006.01) |
| ***G01N 29/22*** | (2006.01) |
| ***G01N 29/265*** | (2006.01) |
| ***G01N 29/44*** | (2006.01) |

(52) U.S. Cl.
CPC ..... *G01N 29/0618* (2013.01); *G01N 29/0663* (2013.01); *G01N 29/225* (2013.01); *G01N 29/265* (2013.01); *G01N 29/4472* (2013.01)

METHOD AND TOOL FOR CALIBRATING A PASSIVE POSITIONING SYSTEM

CROSS-REFERENCE TO RELATED APPLICATIONS

This application is a National Stage of International patent application PCT/EP2022/073207, filed on Aug. 19, 2022, which claims priority to foreign French patent application No. FR 2109075, filed on Aug. 31, 2021, the disclosures of which are incorporated by reference in their entireties.

FIELD OF THE INVENTION

The present invention relates to the field of measurements and of the calibration of the measurement sensors. The invention can be applied to any type of sensors.

BACKGROUND

The invention is presented here, by way of illustration and in a nonlimiting manner, in the field of non-destructive inspection with an ultrasound sensor. Based on the description of the invention, it will be clearly apparent to a person skilled in the art that the principle of the invention can be applied to other types of sensors to calibrate the positioning thereof.

Non-destructive inspection by ultrasounds is a non-invasive method for detecting faults in a part, based on the emission of ultrasounds and the detection of their reflection linked to the acoustic interfaces encountered.

A suitable sensor emits ultrasounds at a frequency (generally between 500 kHz and 100 MHz) chosen as a function of the nature of the part to be inspected. The sensor must be in direct contact with the part for the waves propagated not to be slowed down by the impedance of the air between the point of emission of the sensor and the part.

The waves are reflected on the acoustic interfaces encountered: outlines of the part, internal defects.

The sensor, placed in contact with the part to be inspected, intercepts the waves re-emitted by any defect.

The detected waves are converted into signals by an electronic assembly associated with the sensor. Software assembles these signals to form an image of the interior of the part. The analysis of the images makes it possible to discriminate the echoes due to a defect from those linked to the geometry of the part.

In order to position and orient a particular point of a sensor (for example a point of emission of the signal) accurately in the space, it is necessary to determine the transformation matrix (translation and rotation) between the sensor-holder (located by a positioning device) and the particular point of the sensor. A transformation matrix is a matrix which makes it possible, from the coordinates of an initial point, to find those of its image by a given geometrical transformation. In other words, by knowing the coordinates of the sensor-holder, the transformation matrix makes it possible to determine the coordinates of the point of emission of the signal.

In the field of non-destructive inspection, an operator scans the sensor over an entire, previously defined, zone of examination of the part to be inspected. It is vitally important for the entire zone to be scanned by the sensor. The set of the coordinates of the point of emission of the signal is a crucial element which makes it possible to check that all of the zone has indeed been scanned.

All sensors differ from one another in their geometry. It is therefore necessary to design a sensor support (also called sensor-holder) suitable for each new sensor. Thus, the transformation matrix between the sensor-holder and the sensor is, each time, different and unique. It is difficult to obtain this transformation matrix rapidly, simply and accurately.

The document FR 3 087 254 B1 proposes a method for configuring a device for non-destructive inspection of a mechanical part that makes it possible to determine the position and the orientation of the active surface of the sensor in the reference frame linked to the zone of examination of the mechanical part to be inspected. This method comprises a step of learning the origin and the axes of the active surface in the reference frame associated with a first rigid body fixedly linked to the sensor. This step has to be renewed for each different sensor and first rigid body assembly, and also for any new sensor-holder.

SUMMARY OF THE INVENTION

The invention aims to mitigate all or part of the problems mentioned above by proposing a calibration method and device which makes it possible to simply and rapidly determine the transformation matrix between a sensor-holder and the sensor, while guaranteeing minimizing the errors linked to the manipulation.

To this end, the subject of the invention is a method for calibrating a device for non-destructive inspection of a mechanical part, the device comprising:

- an optical movement tracking system to which a reference reference frame is linked,
- a sensor-holder,
- a first rigid body,
- a non-destructive inspection sensor secured to the sensor-holder fixedly linked to the first rigid body,
- a computer, the method being characterized in that it comprises the following steps

- determination, from three points on a top flat surface of a calibration block, of the length and the width of the calibration block;
- determination of a first transformation matrix from the reference reference frame to a reference frame of the block linked to the calibration block;
- disposition of the sensor on the top flat surface of the calibration block;
- determination, from three points on the first rigid body, of the length and the width of the sensor;
- determination of a second transformation matrix making it possible to switch from a reference frame linked to the sensor-holder to a reference frame linked to the sensor.

Advantageously, the calibration method according to the invention further comprises a step of determination of a third transformation matrix making it possible to switch from the reference reference frame to the reference frame linked to the sensor.

Advantageously, the calibration method according to the invention comprises, prior to the step of determination of the first transformation matrix from the reference reference frame to a reference frame of the block linked to the calibration block, a step of determination of the reference frame of the block linked to the calibration block in the reference reference frame.

Advantageously, the calibration method according to the invention comprises, prior to the step of determination of the second transformation matrix making it possible to switch from a reference frame linked to the sensor-holder to a reference frame linked to the sensor, a step of determination of the reference frame linked to the sensor in the reference frame linked to the sensor-holder.

Advantageously, the calibration method according to the invention comprises, prior to the step of determination of the reference frame linked to the sensor in the reference frame linked to the sensor-holder, a step of determination of a fourth transformation matrix making it possible to switch from the reference frame linked to the sensor-holder to the reference reference frame.

The invention also relates to a device for non-destructive inspection of a mechanical part, comprising:

- an optical movement tracking system to which a reference reference frame is linked,
- a sensor-holder,
- a first rigid body,
- a non-destructive inspection sensor secured to the sensor-holder fixedly linked to the first rigid body,
- a computer, the non-destructive inspection device being characterized in that it comprises a calibration block and in that the computer is configured to

- determine, from three points on a top flat surface of the calibration block, the length and the width of the calibration block;
- determine a first transformation matrix from the reference reference frame to a reference frame of the block linked to the calibration block;
- determine, from three points on the first rigid body, the length and the width of the sensor when it is disposed on the top flat surface of the calibration block;
- determine a second transformation matrix making it possible to switch from a reference frame linked to the sensor-holder to a reference frame linked to the sensor.

Advantageously, the computer is further configured to determine a third transformation matrix making it possible to switch from the reference reference frame to the reference frame linked to the sensor.

Advantageously, the inspection device according to the invention further comprises a pointing device comprising a tip and fixedly linked to a second rigid body, the pointing device being capable of determining the position of points on a surface.

The invention also relates to a computer program comprising instructions which cause the device according to the invention to execute the steps of the calibration method according to the invention.

The invention also relates to a computer-readable storage medium on which is stored said computer program.

The invention also relates to a method for real-time visualization of a signal of non-destructive inspection of a mechanical part, the signal being emitted by a non-destructive inspection device comprising:

- an optical movement tracking system to which a reference reference frame is linked,
- a sensor-holder,
- a first rigid body,
- a non-destructive inspection sensor secured to the sensor-holder fixedly linked to the first rigid body,
- a computer,
- an augmented reality visualization device facing the mechanical part, to which an augmented reality reference frame is linked, the visualization method comprising the steps of the calibration method and the following steps:

- Displacement of the non-destructive inspection sensor over a zone of examination of the mechanical part;
- Simultaneously with the step of displacement of the non-destructive inspection sensor, emission from a point of emission along an axis of emission and reception of the signal by the sensor;
- Determination of an occlusion inside the mechanical part, the occlusion being centered around the point of emission;
- Determination of a surface of intersection of a plane containing the axis of emission in the occlusion;
- Visualization, on the augmented reality visualization device,
- of a real view of the mechanical part, of the sensor-holder and of the non-destructive inspection sensor,
- of a holographic 3D representation of the mechanical part, of the sensor-holder and of the non-destructive inspection sensor, superimposed on the real view,
- of a holographic 3D representation of the occlusion and of the surface of intersection, superimposed on the real view.

BRIEF DESCRIPTION OF THE DRAWINGS

The invention will be better understood and other advantages will become apparent on reading the detailed description of an embodiment given by way of example, the description being illustrated by the attached drawing in which.

DETAILED DESCRIPTION

In the interests of clarity, the same elements will bear the same references in the various figures. For better visibility and in the interests of improved understanding, the elements are not always represented to scale.

The object of the invention lies in the fact of determining, simply and rapidly, the transformation matrix between the sensor-holder and the sensor, in order to calibrate the non-destructive inspection device (by making the mathematical link between the movement tracking device and the point of emission of the sensor).

Figure 1:
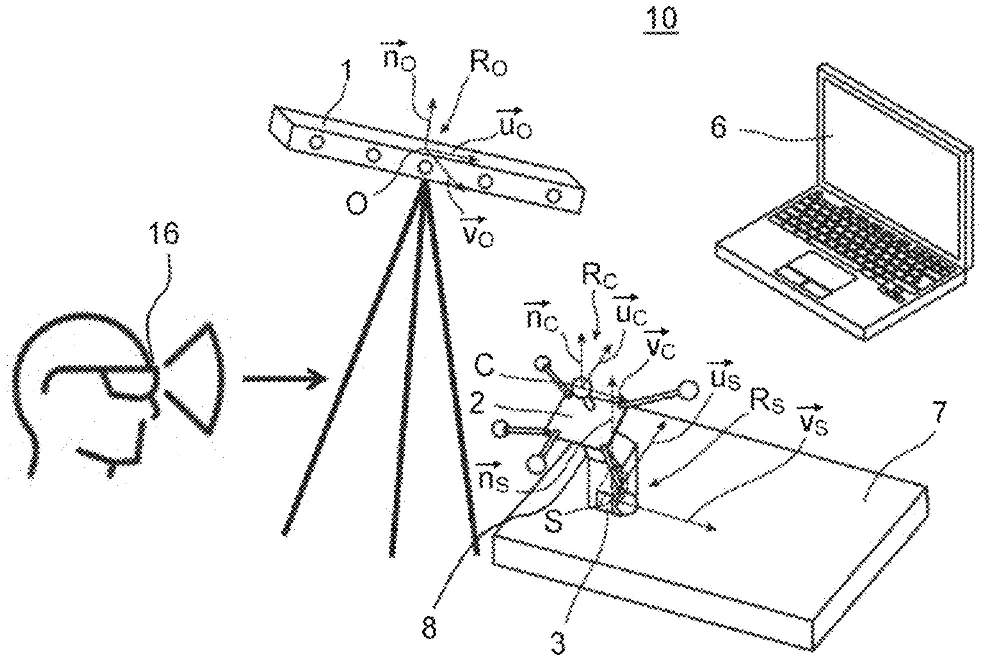
FIG. 1 schematically represents a non-destructive inspection device according to an embodiment of the invention.

FIG. 1 schematically represents a non-destructive inspection device 10 according to an embodiment of the invention. The device 10 for non-destructive inspection of a mechanical part comprises an optical movement tracking system 1, the function of which is to track the movement of an object in the space and more particularly the movement of rigid bodies as described hereinbelow.

The optical movement tracking system 1 is associated with an orthonormal reference frame $R_0=(0, \vec{u_0}, \vec{v_0}, \vec{n_0})$ in which O is the origin of the reference frame and $\vec{u_0}$, $\vec{v_0}$, $\vec{n_0}$ are mutually orthogonal normed vectors.

The optical movement tracking system 1 determines the cartesian coordinates and the orientation of a rigid body in the orthonormal reference frame of the optical movement tracking system 1.

The optical movement tracking system 1 comprises at least two cameras and one or more infrared emitters. Other types of optical system can be used in the context of the invention, for example an optical system based on laser and/or with no-volume markers of pad type. It is important to specify that the system 1 can be a passive (optical or non-optical) movement tracking system.

The non-destructive inspection device 10 comprises a first rigid body 2 linked to a probe, or sensor, 3 and a sensor-holder 8. The sensor 3 is secured to the sensor-holder 8 fixedly linked to the first rigid body 2. The first rigid body 2, the sensor-holder 8 and the sensor 3 are fixedly linked and form an indivisible assembly during the non-destructive inspection. The first rigid body 2 comprises at least three spherical targets that are reflecting in the infrareds situated at distinct positions. The first rigid body 2 is associated with an orthonormal reference frame $R_c=(C, \vec{u_C}, \vec{v_C}, \vec{n_C})$ in which C is the origin of the reference frame and $\vec{u_C}$, $\vec{v_C}$, $\vec{n_C}$ are mutually orthogonal normed vectors.

In a preferred embodiment, the first rigid body 2 comprises six spherical targets. The sensor 3 is for example a single-element ultrasound probe. It comprises an emitting and receiving surface, called active surface, 31. The active surface 31 is a rectangle of flat surface. In a variant, the sensor 3 is of another type, for example an eddy current probe. Generally, an active surface is any surface emitting or receiving physical signals belonging to a non-destructive inspection sensor. For example, in the case of a contact single-element ultrasound sensor, that corresponds to the surface of the piezoelectric. In the case of a single-element ultrasound sensor with a "Plexiglass" shoe, that corresponds to the surface of the shoe through which the ultrasound signals are emitted.

The inspection device 10 comprises a calibration block and a computer 6. Furthermore, the computer is configured to perform the following steps which will be explained hereinbelow:

- determining, from three points on a top flat surface of the calibration block, the length and the width of the calibration block;
- determining a first transformation matrix from the reference reference frame ($R_0$) to a reference frame of the block ($R_a$) linked to the calibration block;
- determining, from three points on the first rigid body (2), the length and the width of the sensor when it is disposed on the top flat surface of the calibration block;
- determining a second transformation matrix making it possible to switch from a reference frame ($R_H$) linked to the sensor-holder to a reference frame ($R_S$) linked to the sensor.

The computer is further configured to determine a third transformation matrix making it possible to switch from the reference reference frame ($R_0$) to the reference frame ($R_S$) linked to the sensor.

The invention is described for the tracking of a sensor, but it applies equally to the tracking of several sensors, simultaneously and independently.

The non-destructive inspection device comprises a computer 6 linked to the optical movement tracking system 1 and to a control module 5. The computer 6 is for example a computer or an electronic circuit board. It notably comprises a processor running a computer program implementing the method which will be described and a memory to store the results thereof. It also comprises input and output interfaces and can be associated with a visualization screen.

The link between the computer 6 and the optical movement tracking system 1 can be wired or wireless. Similarly, the link between the computer 6 and the control module 5 can be wired or wireless.

Figure 2:
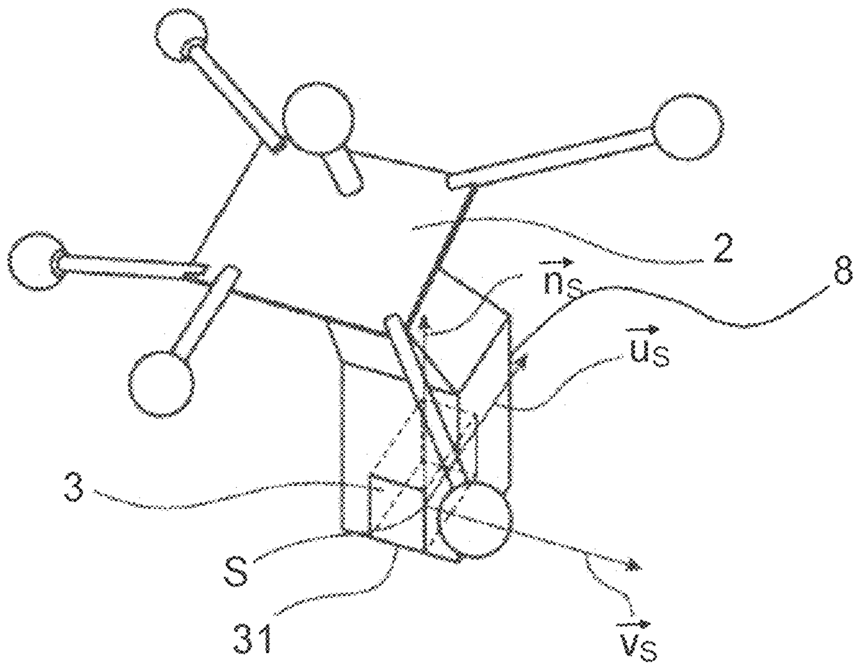
FIG. 2 schematically represents a sensor associated with a sensor-holder of a non-destructive inspection device according to an embodiment of the invention.

FIG. 2 schematically represents a sensor 3 associated with a sensor-holder 8 of a non-destructive inspection device 10 according to an embodiment of the invention. The non-destructive inspection sensor 3 is secured to the sensor-holder 8 fixedly linked to the first rigid body 2. More specifically, the sensor is inserted into a sensor-holder, which is secured to a rigid body making it possible to locate it in the reference frame of the optical positioning system. The bottom surface of the sensor extends substantially in the same plane as the bottom surface of the sensor-holder.

Advantageously, the non-destructive inspection device comprises a pointing device 4.

Figure 3:
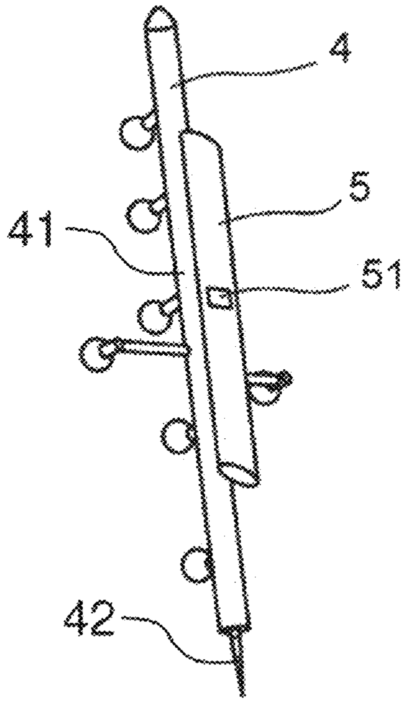
FIG. 3 schematically represents a pointing device according to an embodiment of the invention.

FIG. 3 schematically represents a pointing device 4 according to an embodiment of the invention. The pointing device 4 comprises a second rigid body 41 and a precision tip 42. The second rigid body 41 comprises at least three spherical targets that are reflecting in the infrareds situated at distinct positions. The form of the second rigid body 41, that is to say the exact positioning of the spheres with respect to one another, is known in advance. The second rigid body 41 and the precision tip 42 are fixedly linked and form an indivisible assembly. The origin of the second rigid body 41 has been previously configured to correspond to the tip 42. Thus, the origin of the second rigid body 41 which will be measured by the optical movement tracking system 1 as set out hereinbelow corresponds exactly to the physical point pointed to with the pointing device.

In a preferred embodiment, the second rigid body 41 comprises seven spherical targets.

The non-destructive inspection device comprises a control module 5 provided with at least one actuation button 51. Preferably, the control module 5 is mounted on the pointing device 4 to facilitate the use thereof.

Figure 4:
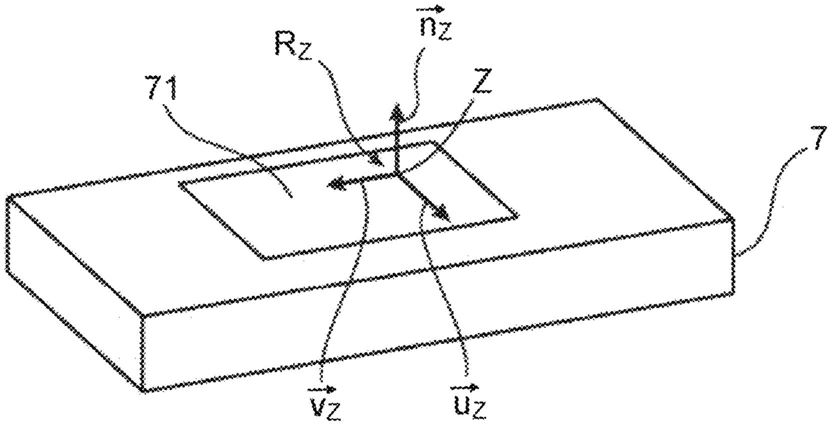
FIG. 4 schematically represents a mechanical part that can be inspected by the non-destructive inspection device of the invention.

FIG. 4 schematically represents a mechanical part 7 that can be inspected by the non-destructive inspection device of the invention. The mechanical part 7 to be inspected comprises an examination zone 71 defined on the surface of the mechanical part 7. The examination zone 71 extends over all or part of the mechanical part. The examination zone is on a part of the mechanical part which has a surface of known geometrical form, such as a flat surface, a cylindrical surface or even a conical surface, for example. In all the cases, the geometrical form of the examination zone can be represented by an analytical function. Alternatively, it is also possible to work from a meshing of the part derived for example from CAD (abbreviation for computer-assisted design) software.

Figure 5:
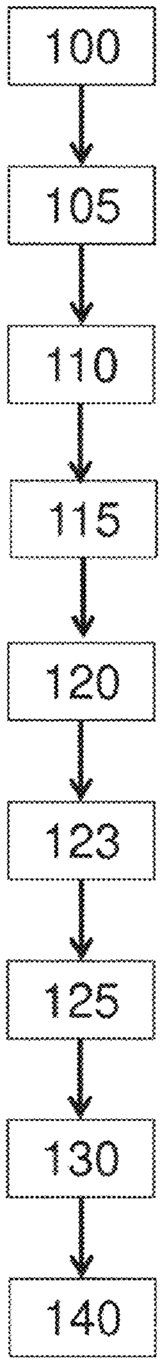
FIG. 5 schematically represents a flow diagram of the steps of a calibration method according to the invention.

FIG. 5 schematically represents a flow diagram of the steps of a calibration method according to the invention. Hereinbelow, the following letters will be used:

- R to qualify a reference frame
- C to qualify the center (or origin) of a reference frame
- I, J and K to qualify the unitary vectors of a reference frame respectively following the axes x, y and z of this same reference frame
- P or Q to qualify a point
- V to qualify a vector
- T to qualify a transformation matrix
- L to qualify a length
- W to qualify a width
- O to qualify the optical positioning system and the associated world reference frame
- B to qualify the calibration block and the associated block reference frame
- H to qualify the sensor-holder and the associated sensor-holder reference frame
- S to qualify the sensor and the associated sensor reference frame To express a vector $\overrightarrow{V_1}$ in the reference frame $R_A$, the notation $\overrightarrow{^{A}V_1}$ is used. It should be noted that a vector serves equally to express a position and a displacement.

Figure 6:
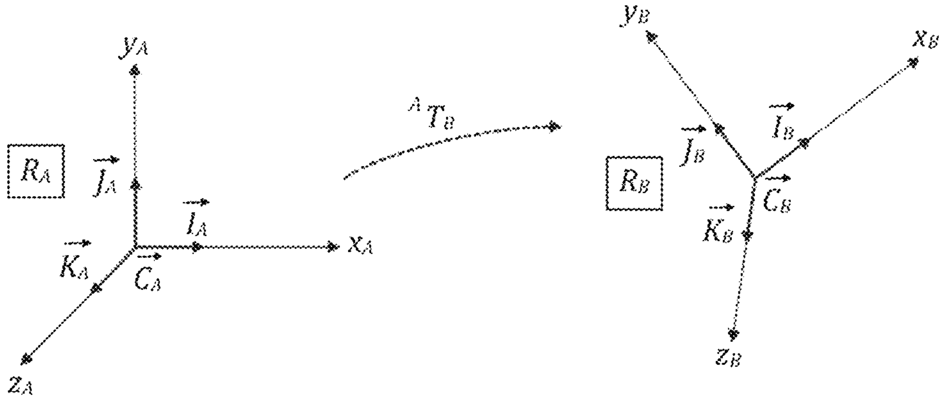
FIG. 6 schematically represents a transformation (composed of a translation and/or a rotation) making it possible to switch from a reference frame $R_A$ to a reference frame $R_B$.

The transformation (composed of a translation and/or of a rotation) making it possible to switch from a reference frame $R_A$ to a reference frame $R_B$ is defined by the transformation matrix ${}^{A}T_B$. FIG. 6 schematically represents such a transformation.

This transformation matrix of 4×4 dimension is composed as follows:

$$
{}^{A}T_B = \begin{bmatrix} \overrightarrow{^{A}I_B} & \overrightarrow{^{A}J_B} & \overrightarrow{^{A}K_B} & \overrightarrow{^{A}C_B} \\ 0 & 0 & 0 & 1 \end{bmatrix} = \begin{bmatrix} {}^{A}I_{xB} & {}^{A}J_{xB} & {}^{A}K_{xB} & {}^{A}C_{xB} \\ {}^{A}I_{yB} & {}^{A}J_{yB} & {}^{A}K_{yB} & {}^{A}C_{yB} \\ {}^{A}I_{zB} & {}^{A}J_{zB} & {}^{A}K_{zB} & {}^{A}C_{zB} \\ 0 & 0 & 0 & 1 \end{bmatrix}
$$

$\overrightarrow{^{A}I_B}$, $\overrightarrow{^{A}J_B}$ and $\overrightarrow{^{A}K_B}$ respectively designate the unitary vectors following the axes $x_B$, $y_B$ and $z_B$ of the reference frame $R_B$ and expressed in the reference frame $R_A$.

$\overrightarrow{^{A}C_B}$ is the vector expressing the origin of the reference frame $R_B$ in the reference frame $R_A$.

The movement tracking system 1 is capable of locating in the space the rigid bodies 2, 41. A rigid body is a non-deformable collection of spherical markers reflecting the infrared rays and can thus be located by the optical positioning system. After calibration, the movement tracking system can associate with a rigid body an origin reference frame which serves to qualify the position and the orientation of rigid bodies in the reference frame of the movement tracking system.

It should be noted that, in order to be correctly located, the rigid bodies must be situated within the solid angle seen by the movement tracking system.

Notably, the movement tracking system is supplied with a factory-calibrated tool that makes it possible to obtain the coordinates of a point of the space within the reference frame of said movement tracking system. Hereinbelow, this tool is called second rigid body 41.

Two different rigid bodies are used in the calibration method of the invention: the second rigid body 41 previously described and the first rigid body 2 used to locate the sensor-holder 8. It is this latter first rigid body 2 which forms the object of the calibration procedure described in the present invention. The aim of this calibration method is to be able to determine rapidly, simply and accurately the geometrical transformation (rotation and/or translation) that exists between the origin of the first rigid body 2 as located by the movement tracking system and the point of emission of the ultrasounds by the sensor 3, independently of the sensor-holder used. In other words, the calibration method of the invention makes it possible to determine the geometrical transformation, in transformation matrix form, between the origin of the first rigid body 2 and a point of the sensor regardless of the form of the sensor-holder necessarily disposed between these two elements.

The inspection device 10 according to the invention comprises

- an optical movement tracking system 1 to which a reference frame (R0) is linked,
- a sensor-holder 8,
- a first rigid body 2,
- a non-destructive inspection sensor 3 secured to the sensor-holder 8 fixedly linked to the first rigid body 2.

The method for calibrating a device for non-destructive inspection of a mechanical part 7 comprises the following steps:

- determination (100), from three points on a top flat surface of a calibration block 14, of the length and the width of the calibration block;
- determination (110) of a first transformation matrix from the reference reference frame ($R_0$) to a reference frame of the block ($R_B$) linked to the calibration block;
- disposition (115) of the sensor 3 on the top flat surface of the calibration block 14;
- determination (120), from three points on the first rigid body (2), of the length and the width of the sensor 3;
- determination (130) of a second transformation matrix making it possible to switch from a reference frame ($R_H$) linked to the sensor-holder to a reference frame ($R_S$) linked to the sensor.

Advantageously, the calibration method according to the invention further comprises a step 140 of determination of a third transformation matrix making it possible to switch from the reference reference frame ($R_0$) to the reference frame ($R_S$) linked to the sensor. The third transformation matrix is obtained by multiplication of the second transformation matrix with the first transformation matrix.

Figure 7:
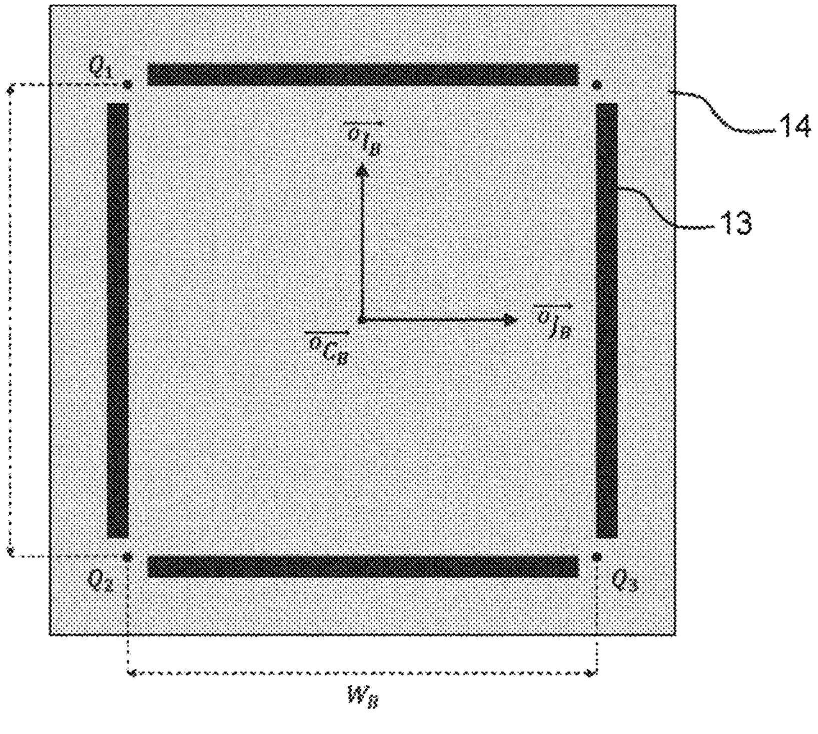
FIG. 7 schematically represents the top surface of a calibration block implemented in the calibration method according to the invention.

The aim of the steps 100 and 110 is to calibrate the calibration block 14 itself, that is to say determine its dimensions (length and width) and associate with it a reference frame $R_B$ linked to the calibration block. The movement tracking system and the calibration block must be firmly fixed in order to avoid any modification of their relative positions and orientations. Then, an operator uses the movement tracking system and the second rigid body 41 in order to acquire three positions on the surface of the calibration block 14. These three positions $Q_1$, $Q_2$ and $Q_3$ are previously marked, advantageously but not mandatorily by small holes created for this purpose on the flat top surface of the calibration block 14, as indicated in FIG. 7. Advantageously, these three positions are situated at three vertices of a rectangle delimited by the blockers 13.

FIG. 7 schematically represents the top surface of a calibration block implemented in the calibration method according to the invention. The calibration block is a part having a flat top surface on which a zone has been delimited by blockers 13. The dimensions of this zone, of rectangular form, are accurately known. As will become clearly apparent hereinbelow, the blockers 13 serve as a stop to correctly position the sensor and sensor-holder assembly at a vertex, preferentially a right-angle, of the zone.

The calibration method according to the invention can comprise, prior to the step 110 of determination of the first transformation matrix from the reference reference frame $R_0$ to a reference frame of the block $R_B$ linked to the calibration block, a step 105 of determination of the reference frame of the block $R_B$ linked to the calibration block in the reference reference frame $R_0$.

More specifically, the computer 6 receives as input three vectors:

Vector defining the first position in the reference reference frame $R_O$: $\overrightarrow{{}^OQ_1}$ Vector defining the second position in the reference reference frame $R_0$: $\overrightarrow{{}^OQ_2}$ Vector defining the third position in the reference reference frame $R_O$: $\overrightarrow{{}^OQ_3}$ The computer 6 calculates the following data:

Length of the block: $L_B$

Width of the block: $W_B$

Transformation matrix making it possible to switch from the reference reference frame $R_O$ to the block reference frame $R_B$: ${}^OT_B$ The calculation steps are detailed hereinbelow.

The vector defining the center of the calibration block in the reference reference frame $R_O$ is calculated:

$$\overrightarrow{{}^OC_B} = \frac{\overrightarrow{{}^OQ_1} + \overrightarrow{{}^OQ_3}}{2}$$

The vector defining the length of the calibration block in the world reference frame $R_O$ is calculated:

$$\overrightarrow{{}^OL_B} = \overrightarrow{{}^OQ_1} - \overrightarrow{{}^OQ_2}$$

The vector defining the width of the calibration block in the world reference frame $R_O$ is calculated:

$$\overrightarrow{{}^OW_B} = \overrightarrow{{}^OQ_3} - \overrightarrow{{}^OQ_2}$$

The length of the calibration block can thus be calculated:

$$L_B = \|\overrightarrow{{}^OL_B}\|$$

The width of the calibration block can also be calculated:

$$W_B = \|\overrightarrow{{}^OW_B}\|$$

From these data, it is possible to calculate the three unitary vectors of the block reference frame $R_B$ in the reference reference frame $R_O$:

$$\overrightarrow{{}^OI_B} = \frac{\overrightarrow{{}^OL_B}}{L_B}$$

$$\overrightarrow{{}^OJ_B} = \frac{\overrightarrow{{}^OW_B}}{W_B}$$

$$\overrightarrow{{}^OK_B} = \overrightarrow{{}^OI_B} \wedge \overrightarrow{{}^OJ_B}$$

Finally, the transformation matrix making it possible to switch from the reference reference frame $R_O$ to the block reference frame $R_B$ is calculated:

$${}^OT_B = \begin{bmatrix} \overrightarrow{{}^OI_B} & \overrightarrow{{}^OJ_B} & \overrightarrow{{}^OK_B} & \overrightarrow{{}^OC_B} \\ 0 & 0 & 0 & 1 \end{bmatrix}$$

Figure 8:
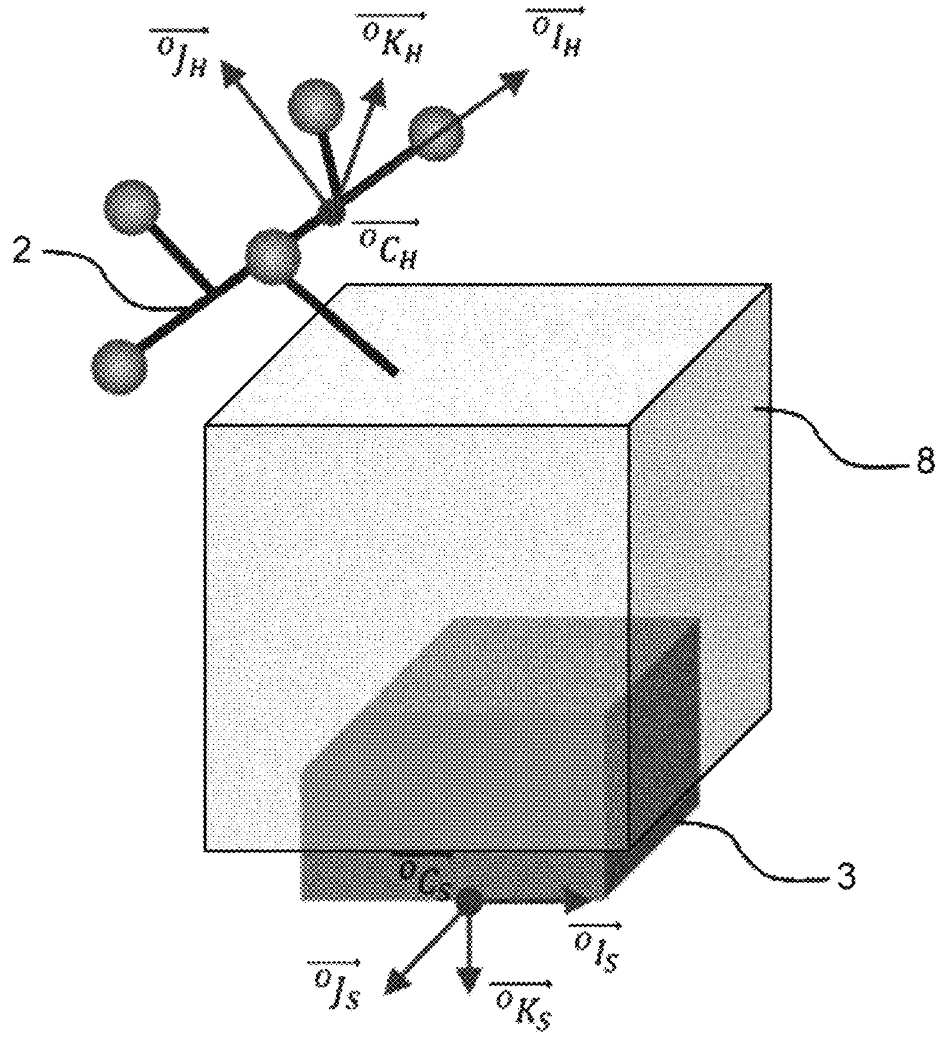
FIG. 8 schematically represents the sensor, sensor-holder and first rigid body of the calibration device according to the invention.

The aim of the steps 120 and 130 is to determine the dimensions of the sensor (length and width), and the transformation matrix between the first rigid body situated on the sensor-holder and the center of the sensor, as indicated in FIG. 8, which schematically represents the sensor, sensor-holder and first rigid body of the calibration device according to the invention.

Figure 9:
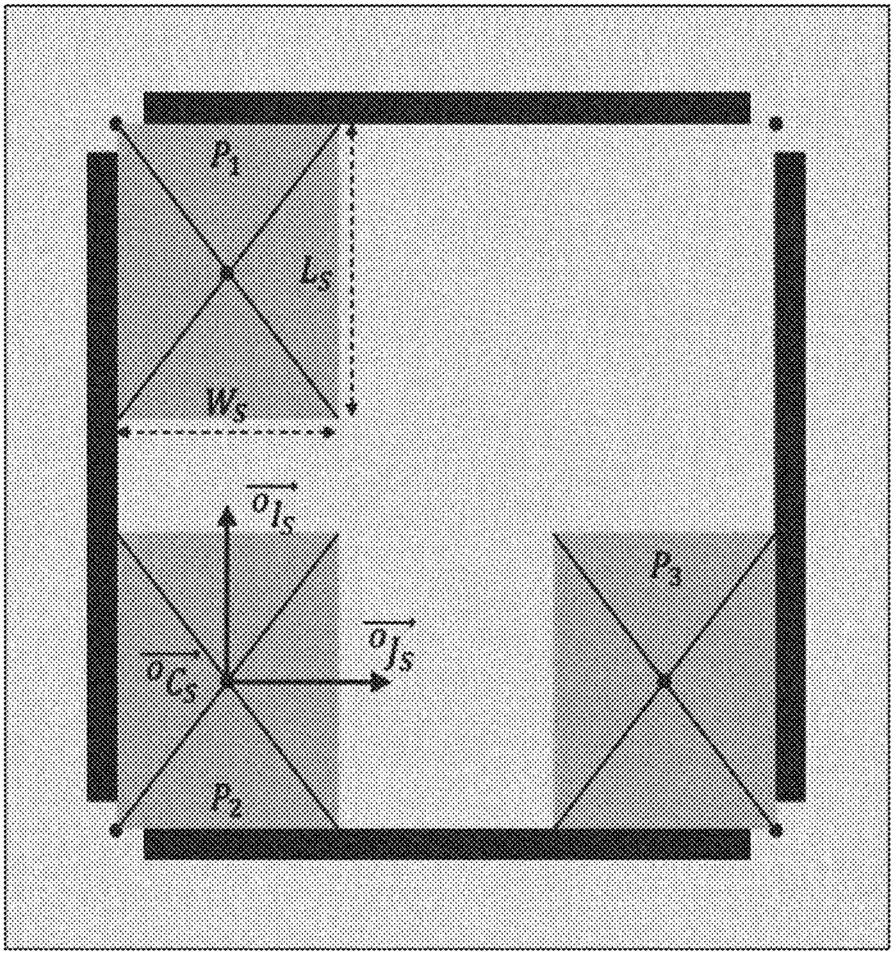
FIG. 9 schematically represents the top surface of a calibration block implemented in the calibration method according to the invention to determine the length and width of the sensor.

FIG. 9 schematically represents the top surface of a calibration block implemented in the calibration method according to the invention to determine the length and width of the sensor.

For the steps 120 and 130 to be carried out, the sensor 3 is disposed (step 115) on the top flat surface of the calibration block 14. The operator acquires three positions of the first rigid block present on the sensor-holder, as visible in FIG. 9. These three positions $P_1$, $P_2$ and $P_3$ correspond respectively to the top left, bottom left and bottom right corners. It should be noted that it is possible to choose a different combination of corners thereof.

Note that the sensor-holder is designed in such a way that it is the sensor itself and not the sensor-holder which comes into contact with the borders (blockers) of the calibration block when the sensor-holder is brought to the positions $P_1$, $P_2$ and $P_3$.

In addition to the data previously available, the computer 6 receives as input three vectors:

Vector defining the first position in the reference reference frame $R_O$: $\overrightarrow{{}^OP_1}$ Vector defining the second position in the reference reference frame $R_O$: $\overrightarrow{{}^OP_2}$ Vector defining the third position in the reference reference frame $R_O$: $\overrightarrow{{}^OP_3}$ The computer 6 calculates the following data:

Length of the sensor: $L_S$

Width of the sensor: $W_S$

Transformation matrix making it possible to switch from the sensor-holder reference frame $R_H$ to the sensor reference frame $R_S$: ${}^HT_S$ The calculation steps are detailed hereinbelow.

The following vectors are calculated:

$$\overrightarrow{{}^OP_{21}} = \overrightarrow{{}^OP_1} - \overrightarrow{{}^OP_2}$$

$$\overrightarrow{{}^OP_{23}} = \overrightarrow{{}^OP_3} - \overrightarrow{{}^OP_2}$$

The length of the sensor is calculated:

$$L_S = L_B - \|\overrightarrow{{}^OP_{21}}\|$$

The width of the sensor is calculated:

$$W_S = W_B - \|\overrightarrow{{}^OP_{23}}\|$$

Finally, the three unitary vectors of the sensor reference frame $R_S$ in the reference reference frame $R_O$ are calculated:

$$\overrightarrow{{}^OI_S} = \overrightarrow{{}^OI_B}$$

$$\overrightarrow{{}^OJ_S} = \overrightarrow{{}^OJ_B}$$

$$\overrightarrow{{}^OK_S} = \overrightarrow{{}^OK_B}$$

It is then possible to calculate the transformation matrix making it possible to switch from the sensor-holder reference frame $R_H$ to the reference reference frame $R_O$, the sensor-holder being at $P_3$:

$${}^OT_H = \begin{bmatrix} \overrightarrow{{}^OI_S} & \overrightarrow{{}^OJ_S} & \overrightarrow{{}^OK_S} & \overrightarrow{{}^OP_3} \\ 0 & 0 & 0 & 1 \end{bmatrix}$$

$${}^HT_O = ({}^OT_H)^{-1}$$

In other words, the calibration method according to the invention comprises, prior to the step 125 of determination of the reference frame $R_S$ linked to the sensor in the reference frame $R_H$ linked to the sensor-holder, a step 123 of determination of a fourth transformation matrix making it possible to switch from the reference frame $R_H$ linked to the sensor-holder to the reference reference frame $R_O$.

The next step consists in calculating the coordinates of the center of the sensor in the reference reference frame $R_O$ (the calculation is made for the sensor-holder at $P_3$):

$$\overrightarrow{{}^OC_S} = \overrightarrow{{}^OQ_3} - \left(\frac{L_S \times \overrightarrow{{}^OI_S}}{2}\right) - \left(\frac{W_S \times \overrightarrow{{}^OJ_S}}{2}\right)$$

The three unitary vectors of the sensor reference frame $R_S$ in the sensor-holder reference frame $R_H$ should also be calculated:

$$\overrightarrow{{}^HI_S} = {}^HT_O \times \overrightarrow{{}^OI_S}$$

$$\overrightarrow{{}^HJ_S} = {}^HT_O \times \overrightarrow{{}^OJ_S}$$

$$\overrightarrow{{}^HK_S} = \overrightarrow{{}^HI_S} \wedge \overrightarrow{{}^HJ_S}$$

Finally, the center of the sensor reference frame $R_S$ in the sensor-holder reference frame $R_H$ is calculated:

$$\overrightarrow{{}^HC_S} = {}^HT_O \times \overrightarrow{{}^OC_S}$$

In other words, the calibration method comprises, prior to the step 130 of determination of the second transformation matrix making it possible to switch from a reference frame $R_H$ linked to the sensor-holder to a reference frame $R_S$ linked to the sensor, a step 125 of determination of the reference frame $R_S$ linked to the sensor in the reference frame $R_H$ linked to the sensor-holder.

To finish, it is possible to calculate the transformation matrix making it possible to switch from the sensor-holder reference frame $R_H$ to the sensor reference frame $R_S$:

$${}^HT_S = \begin{bmatrix} \overrightarrow{{}^HI_S} & \overrightarrow{{}^HJ_S} & \overrightarrow{{}^HK_S} & \overrightarrow{{}^HC_S} \\ 0 & 0 & 0 & 1 \end{bmatrix}$$

The invention defines a mechanical device composed of a calibration block (in plate form) intended to be calibrated by an optical (movement tracking) positioning system and which makes it possible, in conjunction with mathematical calculations, to calibrate a sensor-holder simply, rapidly and accurately. The calibration of the sensor-holder can be performed directly by using a tool that makes it possible to record the positions of different characteristic points. The use of the calibrated calibration block naturally makes it possible to incorporate a constraint of coplanarity which increases the accuracy of the calibration. It is the combination of the calibration of the calibration block and of the sensor which gives this method a particularly advantageous aspect. The result thereof is great simplicity and rapidity of implementation as well as a significant improvement in the accuracy of the calibration compared to the conventional method.

The invention relates also to a method for real-time visualization of a signal of non-destructive inspection of a mechanical part, which can optionally be coupled to the calibration method.

For the implementation of the visualization method, the inspection device 10 can comprise an augmented reality visualization device 16 facing the mechanical part 7, to which an augmented reality reference frame ($R_A$) is linked. It is through this visualization device 16 that the operator sees the real mechanical part, and it is on this visualization device 16 that the holographic 3D representations (detailed later) are displayed superimposed on the view of the mechanical part on the visualization device 16.

The computer 6 can then be configured to a. determine a cut of the occlusion of the mechanical part 7, the cut being centered around the point of emission;

b. determine a surface of projection (or visualization) of the signals constructed from the ultrasound paths of the ultrasound signals delivered by the sensor 3. This surface corresponds to the intersection of the plane containing the axis of emission in the occlusion.

The term occlusion means concealment of the virtual objects behind real things. The occlusion occurs when an object in a 3D space blocks the view of another object. In augmented reality, the objects generated by computer are placed in a real scene to provide additional information or modify the nature of the real objects. Thus, the virtual objects and the real scene must be perfectly aligned in order to maintain high levels of realism and allow the objects to behave as if they were in normal conditions.

The computer 6 notably makes it possible to assemble the signals received by the sensor to form an image of the interior of the part.

And the augmented reality visualization device 16 is configured to display:

a. a real view of the mechanical part 7, of the sensor-holder 8 and of the non-destructive inspection sensor 3, b. a holographic representation in the forms of occlusions of the mechanical part 7', of the sensor-holder 8' and of the non-destructive inspection sensor 3', superimposed on the real view, c. a holographic representation of the cut of the occlusion of the part and of the surface of visualization of the signals, superimposed on the real view.

Figure 10:
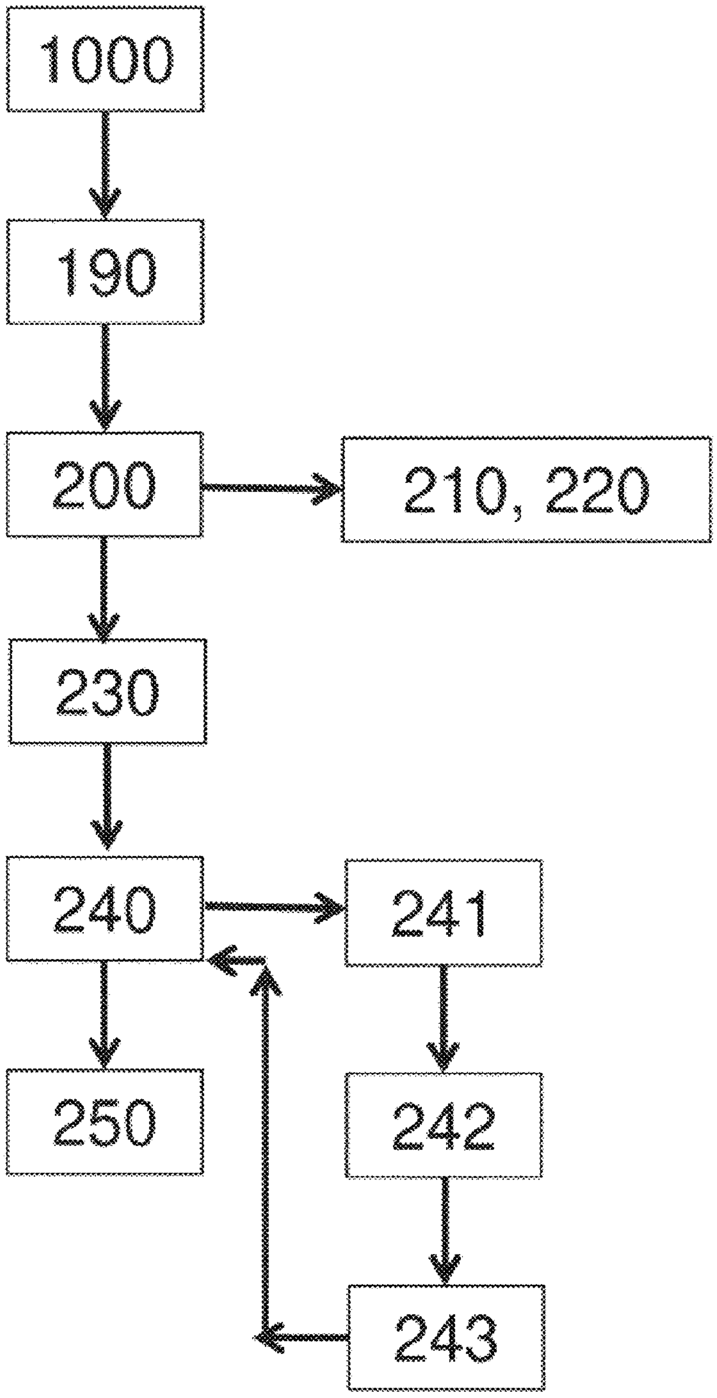
FIG. 10 schematically represents a flow diagram of the steps of the method of real-time visualization of a signal of non-destructive inspection of a mechanical part according to the invention.

FIG. 10 schematically represents a flow diagram of the steps of the method of real-time visualization of a signal of non-destructive inspection of a mechanical part according to the invention. The signal is emitted by the non-destructive inspection device 10 described previously. According to the invention, the visualization method comprises the following steps:

Displacement (step 200) of the non-destructive inspection sensor 3 over a zone of examination of the mechanical part 7;

Simultaneously with the step 200 of displacement of the non-destructive inspection sensor 3, emission (step 210) from a point of emission F along an axis of emission and reception (step 220) of the signal by the sensor 3;

Determination (step 230) of a cut 80 of an occlusion inside the mechanical part 7, the cut 80 being centered around the point of emission F;

Determination (step 240) of a signal visualization surface 81 constructed from the ultrasound paths of the signal, this surface being situated inside the cut 80;

Visualization (step 250), on the augmented reality visualization device 16, of a real view of the mechanical part 7, of the sensor-holder 8 and of the non-destructive inspection sensor 3, of a holographic 3D representation of the mechanical part 7', of the sensor-holder 8' and of the non-destructive inspection sensor 3', superimposed on the real view, of a holographic representation of the cut 80 of the occlusion of the part and of the signal visualization surface 81, superimposed on the real view.

Figure 11:
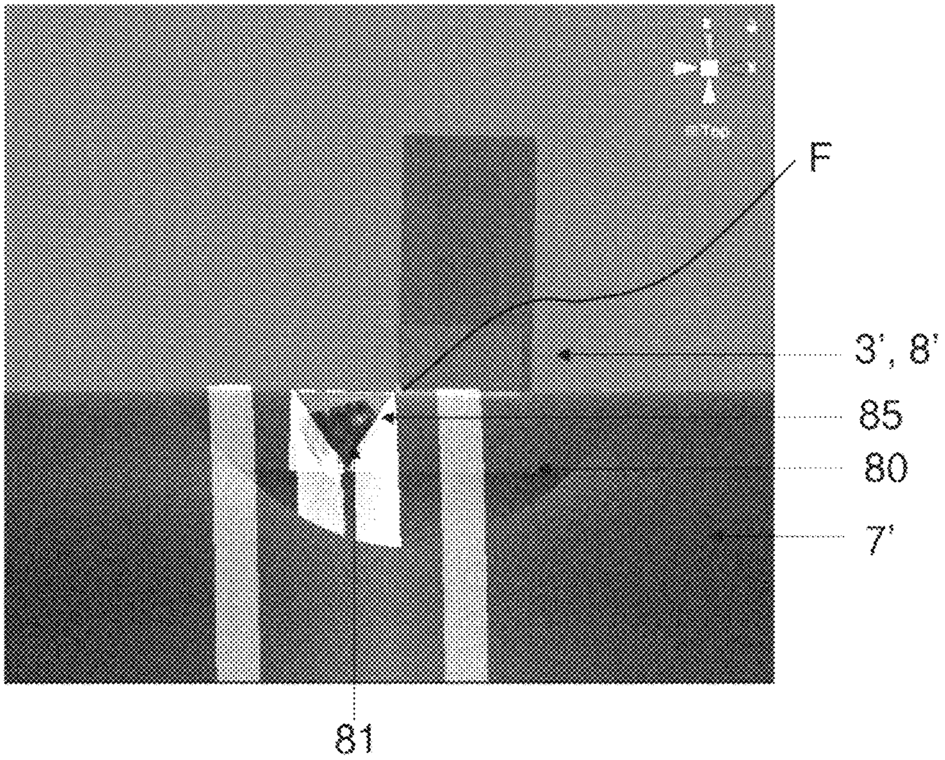
FIG. 11 illustrates the display obtained in the augmented reality visualization device with the visualization method according to the invention.

FIG. 11 illustrates the display obtained in the augmented reality visualization device with the visualization method according to the invention. The occlusion 80 corresponds to a 3D surface of substantially semi-hemispherical form. In other words, the occlusion 80 is a representation of a portion of a volume in the mechanical part 7, around the point F. The reference 85 represents a weld in the mechanical part 7.

Thus, the visualization method makes it possible to obtain a display in the augmented reality visualization device 16. The operator sees therein, through the visualization device 16, the mechanical part 7, the sensor-holder 8 and the sensor 3. In addition to these real objects, the display comprises a holographic 3D representation 7' of the mechanical part, a holographic 3D representation 8' of the sensor-holder, and a holographic 3D representation 3' of the sensor. These three holographic 3D representations are superimposed on the display of the real objects. In addition to the real objects and these holographic 3D representations superimposed on the real objects, the display comprises the holographic 3D representation of the occlusion 80 and the surface of intersection 81, superimposed on the holographic 3D representations superimposed on the real objects.

Hereinafter in the document, reference will be made to the following reference frames:

Reference frame of the augmented reality visualization system under the designation $R_A$: $R_{RA}$.

Reference frame of the target under the designation QRCode: $R_{QR}$.

The visualization method according to the invention comprises, beforehand, a step 190 of calibration of the augmented reality visualization device 16 in the reference reference frame ($R_O$).

Figure 12:
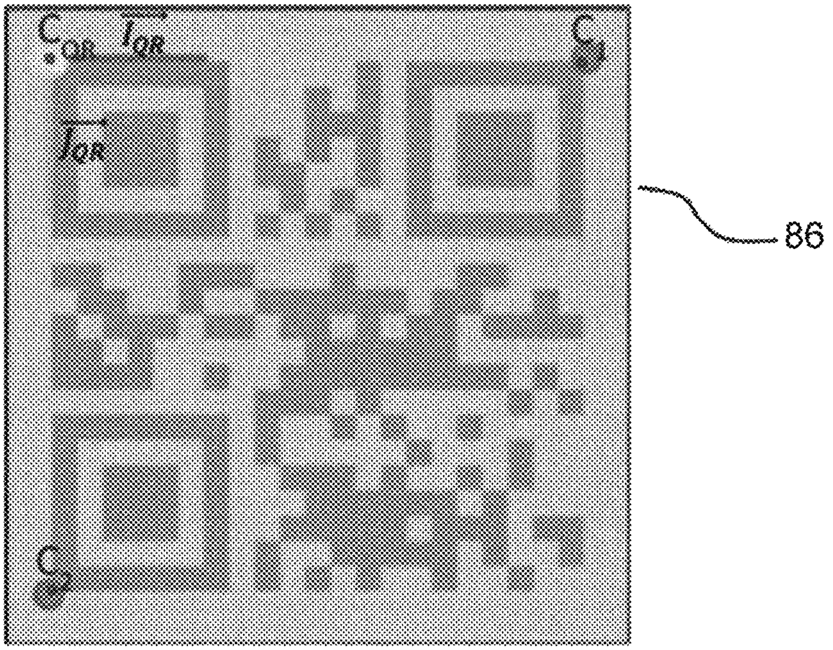
FIG. 12 schematically represents the QR code implemented in the step of calibration of the augmented reality visualization device in the reference reference frame of the visualization method according to the invention.

FIG. 12 schematically represents the QR code implemented in the step 190 of calibration of the augmented reality visualization device in the reference reference frame of the visualization method according to the invention.

In order to define the position of the known elements in the world reference frame in the reference frame of the augmented reality visualization device, the augmented reality visualization device must be calibrated. The augmented reality visualization device establishes an anchor, or a marker, at the location of the QR code. During the calibration, this marker is positioned in the world reference frame, defined by the optical positioning system. The calibration makes it possible to establish the relationship between the two worlds.

In the world of the augmented reality visualization device, the reference frame $R_{QR}$ associated with the QR Code 86 is defined as FIG. 12 shows. To calibrate this reference frame $R_{QR}$ in the world reference frame, the three positions $C_{QR}$, $C_1$ and $C_2$ in the world reference frame are acquired. Next, the QR Code 86 is acquired by the augmented reality visualization device and an internal transformation ${}^{QR}T_{RA}$ is performed which, combined with the matrix ${}^{O}T_{QR}$, allows the positioning in the reference frame RA of all of the elements positioned and tracked in the world reference frame. In a way similar to what was detailed previously for the calibration step 1000, the following relationships apply here:

$$ {}^{O}T_{QR} = \begin{bmatrix} \overrightarrow{{}^{O}I_{QR}} & \overrightarrow{{}^{O}J_{QR}} & \overrightarrow{{}^{O}K_{QR}} & \overrightarrow{{}^{O}C_{QR}} \\ 0 & 0 & 0 & 1 \end{bmatrix} $$

The vector $\overrightarrow{{}^{O}I_{QR}}$ in the world reference frame is:

$$\overrightarrow{{}^{O}I_{QR}} = \frac{\overrightarrow{C_{QR}C_1}}{\|\overrightarrow{C_{QR}C_1}\|}$$

The vector $\overrightarrow{{}^{O}J_{QR}}$ in the world reference frame is:

$$\overrightarrow{{}^{O}J_{QR}} = \frac{\overrightarrow{C_{QR}C_2}}{\|\overrightarrow{C_{QR}C_2}\|}$$

The vector $\overrightarrow{{}^{O}K_{QR}}$ in the world reference frame is:

$$\overrightarrow{{}^{O}K_{QR}} = \overrightarrow{{}^{O}I_{QR}} \wedge \overrightarrow{{}^{O}J_{QR}}$$

Figure 13:
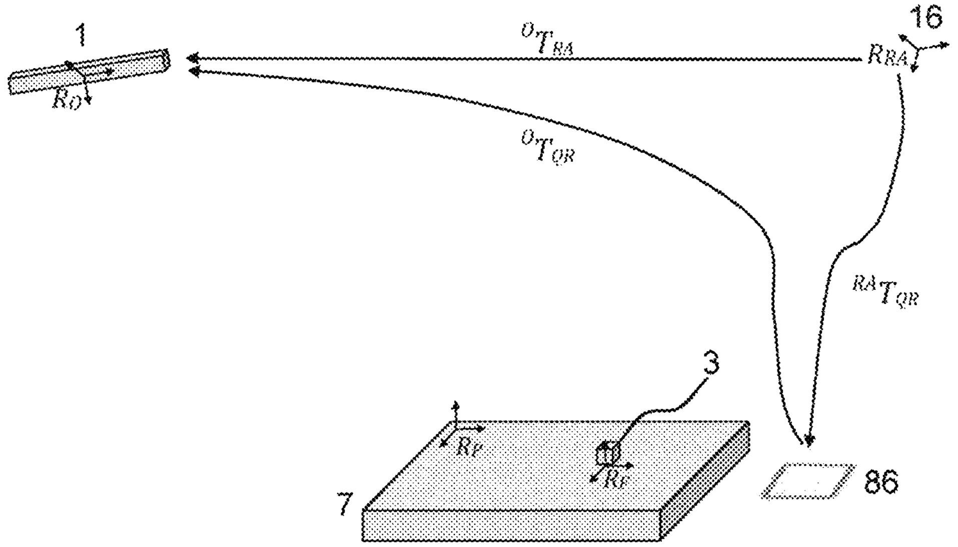
FIG. 13 schematically represents the transformation matrices in the visualization method according to the invention.

FIG. 13 schematically represents the transformation matrices in the visualization method according to the invention.

The calibration step 1000 defines and describes how to obtain by calibration the following transformation matrices:

- the transformation matrix making it possible to switch from the sensor reference frame RF to the world reference frame $R_O$: ${}^{F}T_O$. By inversion of this matrix, ${}^{O}T_F$ also applies.
- the transformation matrix making it possible to switch from the part reference frame $R_P$ to the world reference frame $R_O$: ${}^{P}T_O$. By inversion of this matrix, ${}^{O}T_P$ also applies.
- the transformation matrix making it possible to switch from the RA reference frame $R_{RA}$ to the world reference frame $R_O$: ${}^{RA}T_O$. By inversion of this matrix, ${}^{O}T_{RA}$ also applies.

Figure 14:
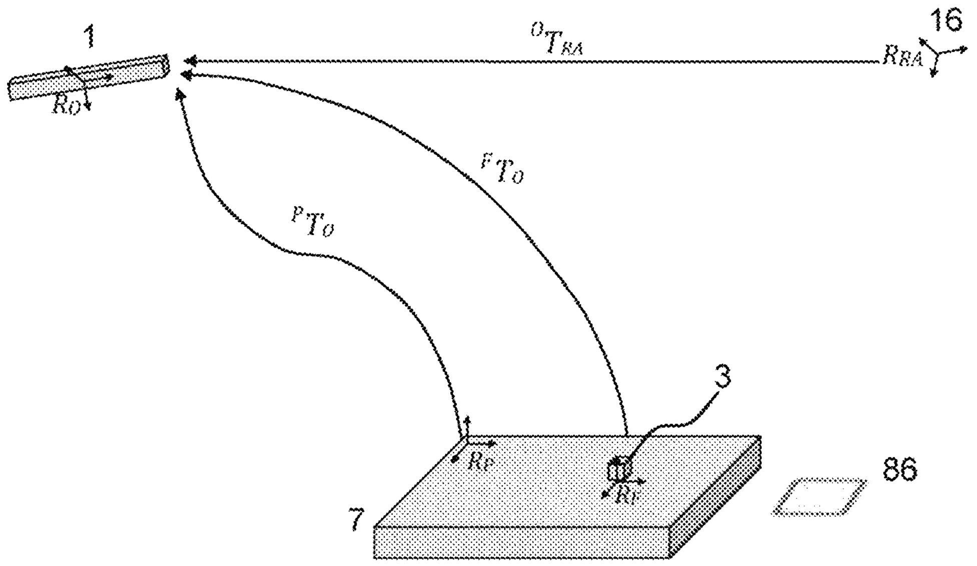
FIG. 14 schematically represents the transformation matrices in the visualization method according to the invention.

FIG. 14 schematically represents these transformation matrices in the visualization method according to the invention.

The origin F of the sensor 3 can be positioned in the part reference frame $R_P$:

$${}^{P}P_F = {}^{P}T_O({}^{O}P_F)$$

All the information I linked spatially to this point F such as the ultrasound paths and the sector scan reconstructed from the latter and from the physical signals can then be located in the reference frame of the augmented reality visualization device $R_{RA}$:

$${}^{RA}P_I = {}^{RA}T_O({}^{O}P_I)$$

In order to clarify the different elements of the 3D scene to be visualized, the 3D object containing the signals to be viewed by the operator can hereinafter be designated as "main object" and the 3D objects with respect to which the main object is positioned (notably the part and the sensor) can be designated as "secondary objects". It should be noted that, with respect to augmented reality, each of the objects described previously is visualized in hologram form and is superimposed perfectly on a real object, thus creating an occlusion of this real object.

As already stated, the objective of the method of the invention is to allow the user to view the main object constructed from ultrasound data (sector scan for example) and to position it in 3D in augmented reality by giving the impression to the user of viewing the interior of the part.

For the human being to correctly visually interpret the positioning of this main object in the 3D visual space, the display of the hologram of this main object is not sufficient. The hologram will give the impression of floating and its spatial relationship with the volume of the part will be lost. In the particular case described here, the volume concerned is the volume passed through by the ultrasound signals that were used to construct this main object.

The invention consists in displaying the hologram of this main object accompanied by a set of graphic occlusions corresponding to the holograms of the secondary objects. The secondary objects are the part and the sensor (accompanied by its sensor-holder) in particular. For these occlusions not to totally conceal the real objects, the occlusions advantageously have a medium level of transparency. The graphic occlusions of the part (comprising possibly a weld to be inspected) and of the sensor are therefore produced with textures and colors that have a percentage of transparency.

In order for the brain to interpret the main object as forming part of the internal integrity of the part (and possibly of the weld), it is essential for this main object to appear on the graphic occlusion of the part. In order to achieve this objective, a transparent opening of the graphic occlusions of the part is produced. This is the occlusion 80. This opening is centered on the sensor (more specifically the point F of the sensor, the point with respect to which the main object to be displayed is located). This opening 80 is also a 3D object and a part of the surface of its volume coincides with the surface of the main object.

So as not to hamper the operator with information situated outside of his or her field of view (for example the back of the part), the visible data, and therefore the direction of the opening, are selected as a function of the position and of the orientation of the eye of the operator. Thus, if the operator views the holograms from the front or the rear of the part, the holograms remain well oriented. That is made possible by virtue of the calibration of the visualization device 16 with respect to the movement tracking device 1.

The step 240 of determination of the surface of intersection 81 comprises the following steps:

- Calculation (step 241) of the paths taken by the signal emitted by the sensor 3;
- Production (step 242) of a 3D meshing representative of the mechanical part 7, of the sensor-holder 8, of the non-destructive inspection sensor 3, and of the paths taken by the signal;
- Laying (step 243) of the paths taken by the signal on the 3D meshing.

In other words, the step 240 allows the visualization of a sector scan in the augmented reality visualization device 16. This is the surface of intersection 81 of the plane containing the axis of emission in the occlusion 80.

By virtue of the invention, it is thus possible for the operator to view the secondary objects (that is to say real objects: mechanical part 7 to be inspected, the sensor-holder 8 and the sensor 3), on which the main object containing the signals to be visualized, that is to say the assembly formed by the occlusion 80 and the surface 81, is superimposed.

In a particular embodiment, the steps of the method according to the invention are implemented by computer program instructions. Consequently, the invention also targets a computer program on an information medium, this program being able to be implemented in a computer, this program comprising instructions suited to the implementation of the steps of a method as described above.

This program can use any programming language, and be in the form of source code, object code, or of intermediate code between source code and object code, such as in a partially compiled form, or in any other desirable form. The invention also targets a computer-readable information medium, comprising computer program instructions suited to the implementation of the steps of a method as described above.

The information medium can be any entity or device capable of storing the program. For example, the medium can comprise a storage means, such as a ROM, for example a CD ROM or a microelectronic circuit ROM, or even a magnetic storage means, for example a diskette or a hard disk.

Also, the information medium can be a transmissible medium such as an electrical or optical signal, which can be rerouted via an electrical or optical cable, wirelessly or by other means. The program according to the invention can in particular be downloaded over a network of Internet type.

Alternatively, the information medium can be an integrated circuit in which the program is incorporated, the circuit being adapted to execute or to be used in the execution of the method according to the invention.

It will become apparent more generally to the person skilled in the art that various modifications can be made to the embodiments described above, in light of the teaching which has just been disclosed to him or her. In the claims which follow, the terms used should not be interpreted as limiting the claims to the embodiments set out in the present description, but should be interpreted to include therein all the equivalents that the claims aim to cover through the formulation thereof and the planning of which is within the scope of the person skilled in the art based on his or her general knowledge.

The invention claimed is:

1. A method for calibrating a device for the non-destructive inspection of a mechanical part, the device comprising:

an optical movement tracking system to which a reference frame ($R_0$) is linked, a sensor-holder, a first rigid body, a non-destructive inspection sensor secured to the sensor-holder fixedly linked to the first rigid body, and a computer, the method comprising the following steps executed by the computer:

determination, from the acquisition of the position of three points on a top flat surface of a calibration block by the optical movement tracking system, the length and the width of the calibration block;

determination of a first transformation matrix from the reference frame ($R_0$) to a reference frame of the block ($R_B$) linked to the calibration block from the determined length and width of the calibration block;

determination, from the acquisition of the position of three points on the first rigid body by the optical movement tracking system, of the length and the width of the sensor when the sensor is disposed in three distinct positions ($P_1$, $P_2$, $P_3$) on the top flat surface of the calibration block;

determination of a second transformation matrix making it possible to switch from a reference frame ($R_H$) linked to the sensor-holder to a reference frame ($R_S$) linked to the sensor from the determined length and width of the sensor.

2. The calibration method as claimed in claim 1, further comprising a step of determination of a third transformation matrix making it possible to switch from the reference frame ($R_0$) to the reference frame ($R_S$) linked to the sensor.

3. The calibration method as claimed in claim 1, comprising, prior to the step of determination of the first transformation matrix of the reference frame ($R_0$) to a reference frame of the block ($R_B$) linked to the calibration block, a step of determination of the reference frame of the block ($R_B$) linked to the calibration block in the reference frame ($R_0$).

4. The calibration method as claimed in claim 1, comprising, prior to the step of determination of the second transformation matrix making it possible to switch from a reference frame ($R_H$) linked to the sensor-holder to a reference frame ($R_S$) linked to the sensor, a step of determination of the reference frame ($R_S$) linked to the sensor in the reference frame ($R_H$) linked to the sensor-holder.

5. The calibration method as claimed in claim 4, comprising, prior to the step of determination of the reference frame ($R_S$) linked to the sensor in the reference frame ($R_H$) linked to the sensor-holder, a step of determination of a fourth transformation matrix making it possible to switch from the reference frame ($R_H$) linked to the sensor-holder to the reference frame ($R_0$).

6. A device for the non-destructive inspection of a mechanical part, comprising:

an optical movement tracking system to which a reference frame ($R_0$) is linked, a sensor-holder, a first rigid body, a non-destructive inspection sensor secured to the sensor-holder fixedly linked to the first rigid body, and a computer, the non-destructive inspection device further comprising a calibration block; and wherein the computer is configured to;

determine, from the acquisition of the position of three points on a top flat surface of the calibration block by the optical movement tracking system, the length and the width of the calibration block;

determine a first transformation matrix from a reference frame ($R_0$) to a reference frame of the block ($R_B$) linked to the calibration block from the determined length and width of the calibration block;

determine, from the acquisition of the position of three points on the first rigid body by the optical movement tracking system, the length and the width of the sensor when the sensor is disposed in three distinct positions ($P_1$, $P_2$, $P_3$) on the top flat surface of the calibration block;

determine a second transformation matrix making it possible to switch from a reference frame ($R_H$) linked to the sensor-holder to a reference frame ($R_S$) linked to the sensor from the determined length and width of the sensor.

7. The inspection device as claimed in claim 6, wherein the computer is further configured to determine a third transformation matrix making it possible to switch from the reference frame ($R_0$) to the reference frame ($R_S$) linked to the sensor.

8. The inspection device as claimed in claim 6, further comprising a pointing device comprising a tip and fixedly linked to a second rigid body, the pointing device being capable of determining the position of points on a surface.

9. A non-transitory computer-readable medium comprising a computer program comprising instructions which cause the device as recited in claim 1, which further comprises a calibration block, to execute the steps of the method as recited in claim 1.

10. A non-transitory computer-readable storage medium on which is stored the computer program as claimed in claim 9.

11. A method for real-time visualization of a signal of non-destructive inspection of a mechanical part, the signal being emitted by a non-destructive inspection device comprising:

an optical movement tracking system to which a reference frame ($R_0$) is linked, a sensor-holder, a first rigid body, a non-destructive inspection sensor secured to the sensor-holder fixedly linked to the first rigid body, a computer, and an augmented reality visualization device facing the mechanical part, to which an augmented reality reference frame ($R_A$) is linked, the visualization method comprising the steps of the calibration method as claimed in claim 1 and further the following steps:

displacement of the non-destructive inspection sensor over a zone of examination of the mechanical part;

simultaneously with the step of displacement of the non-destructive inspection sensor, emission from a point of emission along an axis of emission and reception of the signal by the sensor;

determination of an occlusion inside the mechanical part, the occlusion being centered around the point of emission;

determination of a surface of intersection of a plane containing the axis of emission in the occlusion; and , visualization, on the augmented reality visualization device:

of a real view of the mechanical part, of the sensor-holder and of the non-destructive inspection sensor, of a holographic 3D representation of the mechanical part, of the sensor-holder and of the non-destructive inspection sensor, superimposed on the real view, and of a holographic 3D representation of the occlusion and of the point of intersection, superimposed on the real view.

* * * * *